United States Patent [19]

Bouffard

[11] 4,260,315
[45] Apr. 7, 1981

[54] ELEVATABLE BED VEHICLE

[76] Inventor: Joseph A. Bouffard, 8160 Williams Rd., Apt. 278, Richmond, British Columbia, Canada, V7A 1G5

[21] Appl. No.: 895,930

[22] Filed: Apr. 13, 1978

[51] Int. Cl.³ .............................................. B60P 1/04
[52] U.S. Cl. .................................... 414/469; 414/478; 414/485; 280/43.23; 280/43.11
[58] Field of Search ................. 280/43, 43.13, 43.11, 280/43.14, 43.17, 43.23, 80 B, 43.24; 246/1 A; 414/467, 469, 476, 478, 480, 482, 491, 494, 495, 485; 180/12, 54 F, 55

[56] References Cited
U.S. PATENT DOCUMENTS

| 1,208,693 | 12/1916 | Swanson | 280/43.11 |
| 2,648,546 | 8/1953 | Falkenhagen | 280/43.24 |
| 2,706,009 | 4/1955 | Schramm | 280/43.11 |
| 2,774,604 | 12/1956 | Rendel et al. | 280/43.23 |
| 3,147,023 | 9/1964 | Raymo | 280/43.23 |
| 3,430,791 | 3/1969 | Moss | 280/43.23 |
| 3,633,775 | 1/1972 | Pugliese | 414/476 |
| 4,003,583 | 1/1977 | Stanzel | 414/495 X |

Primary Examiner—Stephen G. Kunin
Assistant Examiner—R. B. Johnson

[57] ABSTRACT

A front wheel drive vehicle having a bed supported by the rear wheels of the vehicle by a pair of jacks. The jacks cause lowering of the bed rear end to rest on the road surface for embarkation of a disabled vehicle on the bed.

4 Claims, 5 Drawing Figures

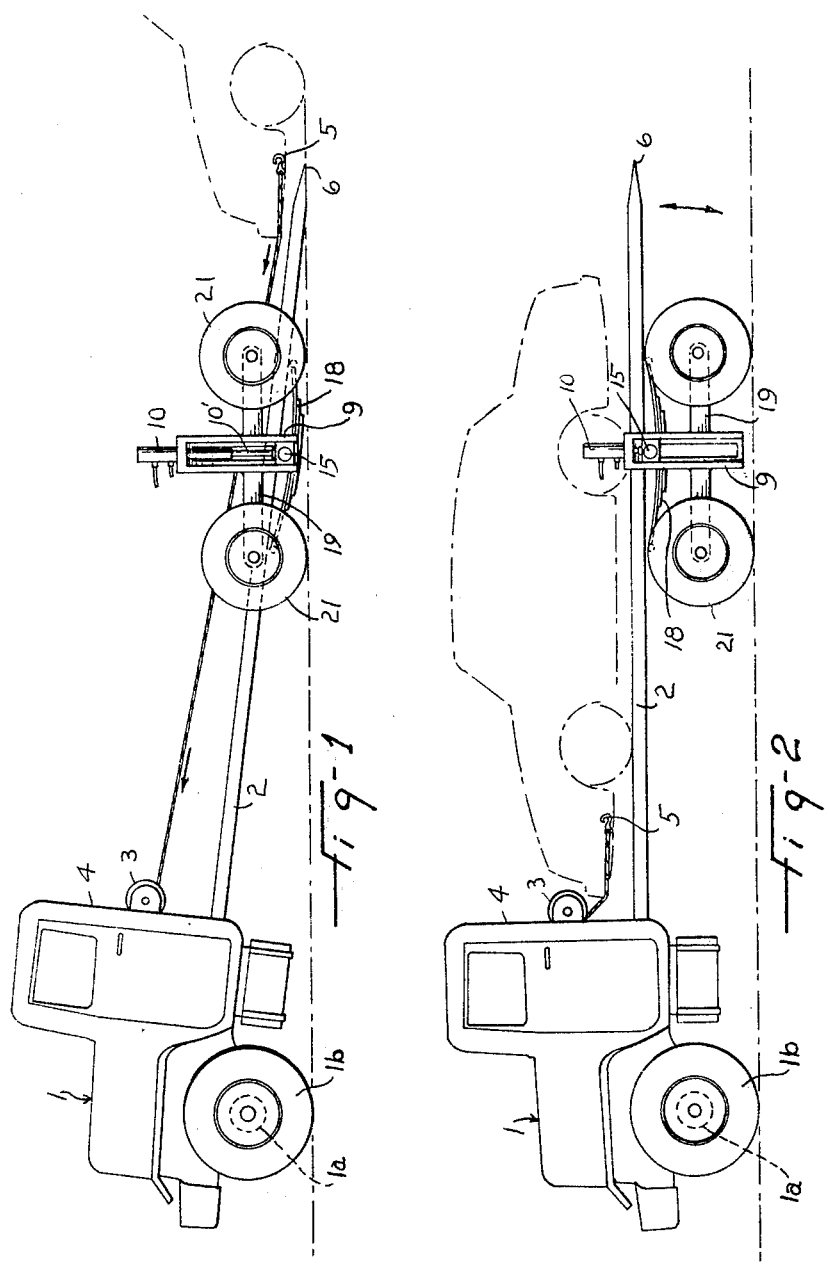

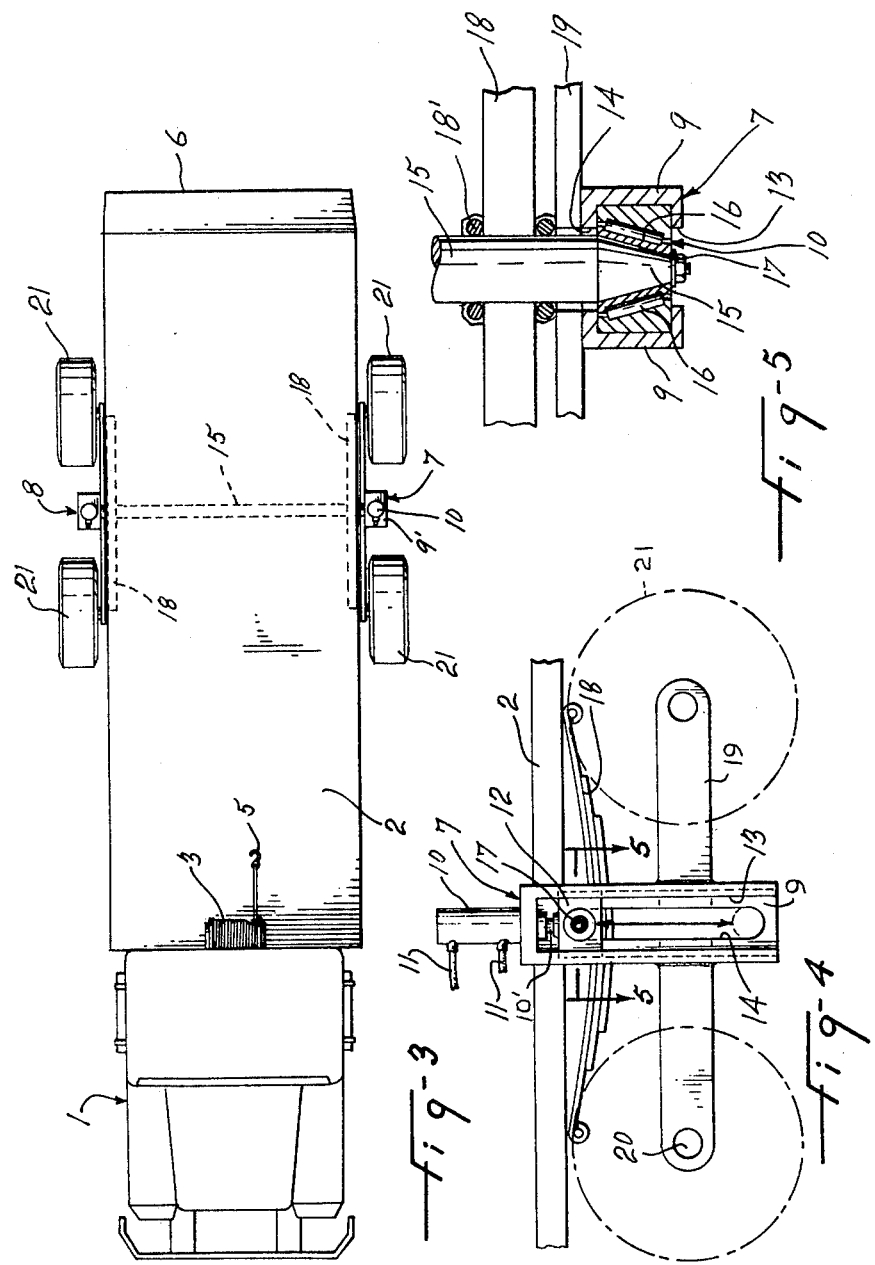

ELEVATABLE BED VEHICLE

This invention relates to elevatable bed vehicles or tractor flat-bed trailers meant to transport heavy loads, and more specifically to a new type of vehicle having a bed whose loading rear end may be lowered to the surface on which a vehicle stands for embarkation of the vehicle.

Accordingly, it is an object of the present invention to provide a vehicle having an elevatable bed which may be lowered and raised by simple lifting means, which takes up a minimum of room.

It is another object of the present invention to provide an elevatable bed vehicle which does not require running gear under the elevatable bed.

In keeping with these objects and other advantages of the present invention, a preferred embodiment includes a front-wheel drive vehicle having a back bed secured to the vehicle chassis. The bed is supported near its loading rear end by two laterally opposed jacking means, one on the respective side of the elevatable bed. The two jacking means are co-operatively secured by their lifting elements by a transverse shaft. Both of the jacking means each incorporate a horizontal and longitudinally extending beam which projects on each side of the jacking means. The beams have two transverse secured axles at their opposite ends to which are rotatively secured wheels. To reduce travel vibration and shock, conventional leaf springs are secured to the jacking means and the adjacent undersides of the elevatable bed.

The above will be better understood by referring to a preferred embodiment of the invention illustrated by way of the accompanying drawings, in which:

FIG. 1 is a side view showing the vehicle bed in lowered position ready for embarkation of a vehicle;

FIG. 2 is a side view showing the vehicle bed in raised travel position and a vehicle secured on the bed;

FIG. 3 is a top plan view of the elevatable bed vehicle;

FIG. 4 is a side view of one of the jacking means showing the wheels in dashed outlines; and FIG. 5 is a sectional view taken along line 5—5 of FIG. 4.

The numerals refer to like elements throughout the drawings.

The elevatable bed vehicle of the present invention includes a truck 1 equipped with front wheel drive schematically shown at 1a for driving front wheels 1b and having an elevatable bed 2 rigidly secured to the chassis of the truck. A winch 3 is rigidly fixed to the back cabin wall 4 for pulling a vehicle up onto the elevatable bed 2, as shown in FIG. 2. Winch 3 has a hook 5 at the end of its cable.

The elevatable bed is made of suitably rigid material and is of a certain thickness tapering to an edge 6 at its vehicle embarkation rear end.

The elevatable bed 2 is supported not only at the truck front end portion 1 but also near the embarkation end by way of the jacking means 7 and 8 on the left and right sides of the elevatable bed 2, respectively.

Jacking means 7 and 8 are identical. Taking jacking means 7 for example, the means includes a vertical guide member 9, generally rectanglar in cross-section and having a rigidly secured top plate 9' with a round hole provided therein, in which is secured the vertical cylinder 10 of a double-acting cylinder and piston unit supplied by tubing 11 with hydraulic fluid supplied by a pump driven by the truck engine and controlled by valves (not shown) The piston rod 10' of cylinder 10 is connected to a block 12 vertically slidable and guided in guide member 9. There are two lateral vertical slots in member 9: an exterior slot 13 and an interior slot 14. (seen in FIG. 5).

A transverse rod 15 extends entirely underneath the elevatable bed 2, freely passes through interior slot 14 and is journalled in block 12 of both jacks 7 and 8 by means of needle bearings 16 retained in position by nut and washer 17. Transverse rod 15 is attached to the underside of elevatable bed 2 by means of leaf springs 18 and brackets 18', as shown in FIGS. 4 and 5 and is turnable in each block 12 as they ascend or descend.

As shown clearly in FIGS. 1, 2, and 4, blocks 12 move up and down in vertical member 9 under action of cylinder 10, thus lowering or raising elevatable bed 2 from a loading position wherein edge 6 is in contact with the surface on which the vehicle to be loaded rests, to a travel position wherein elevatable bed 2 is horizontal with the ground.

Two separate longitudinal beams 19 are welded or otherwise rigidly secured horizontal to the ground at their respective inner end to the lower mid-portion of vertical member 9. A transverse axle 20 is secured to the respective outer end of beams 19 for the rotative support of respective wheels 21.

It is to be noted that the leaf spring suspension 18 is superior to coil springs or other means, since leaf springs allow the elevatable bed to be lowered a greater distance without encumbrance, as shown clearly in FIG. 1.

As shown clearly in FIG. 3, the wheels 21 are secured to the exterior of the maximum width of elevatable bed 2 and, therefore, do not hamper the lowering of the elevatable bed 2.

I claim

1. An elevatable bed vehicle comprising a chassis equipped with front wheels, a front wheel drive, a flat bed rigidly secured to said chassis and over the latter, said flat bed having longitudinal sides and a rear loading end, a transverse shaft entirely extending across and underneath said flat bed and attached to the same, a set of tandem ground-engaging wheels located on each longitudinal side of said flat bed adjacent the loading rear end of the latter and spaced outwardly from the respectiive longitudinal sides; two identical jacking means, one located on each longitudinal side of said flat bed and between each set of said wheels, each said jacking means including an upright tubular guide member, non-circular in internal cross-section and having a lateral vertically-oriented interior slot, each said slot freely receiving the corresponding outer end portion of said transverse shaft, a block in which each corresponding outer end of said shaft is journalled, said block being slidable, but not rotatable, within said guide member; each said set of ground-engaging wheels being rotatively secured to said guide member, thereby supporting the latter in upright position, said jacking means further including power means carried by said guide member and connected to said block to move the latter along said guide member, whereby said elevatable bed may be raised and lowered from a first horizontal travel position to a second inclined position wherein the said loading rear end is in touch with the ground, and wherein said ground-engaging wheels are in contact with the ground in any position of the elevatable bed.

2. An elevatable bed vehicle as defined in claim 1, further including two horizontally-extending longitudinal beams secured to the lower portion of said guide member at their inner ends and each extending away from said guide member, a transverse axle carried by the outer end of each beam, each of said tandem wheels being rotatably retained on one of said transverse axles.

3. An elevatable bed vehicle as defined in claim 2, wherein said transverse shaft is attached to said bed by means of leaf springs rigidly secured to said shaft under each longitudinal side of said flat bed and pivotally attached to the underside of said flat bed.

4. An elevatable bed vehicle as defined in claim 1, 2 or 3, wherein said vehicle has a front cabin and includes a winch mounted adjacent the rear wall of said cabin.

* * * * *